United States Patent [19]
Frutschi

[11] Patent Number: 5,495,709
[45] Date of Patent: Mar. 5, 1996

[54] AIR RESERVOIR TURBINE

[75] Inventor: Hans U. Frutschi, Riniken, Switzerland

[73] Assignee: ABB Management AG, Baden, Switzerland

[21] Appl. No.: 286,211

[22] Filed: Aug. 5, 1994

[30] Foreign Application Priority Data

Aug. 5, 1994 [CH] Switzerland ............ 02 453/94

[51] Int. Cl.⁶ .................................................. F02C 7/00
[52] U.S. Cl. ....................................... 60/39.55; 60/727
[58] Field of Search ............................ 60/727, 39.02, 60/39.05, 39.53, 39.55, 39.59

[56] References Cited

U.S. PATENT DOCUMENTS

| | | | |
|---|---|---|---|
| 4,522,024 | 6/1985 | Zaugg | 60/727 |
| 4,523,432 | 6/1985 | Frutschi | 60/727 |
| 4,537,023 | 8/1985 | Nakamura et al. | 60/39.05 |
| 4,630,436 | 12/1986 | Frutschi | 60/727 |
| 4,686,822 | 8/1987 | Frutschi | 60/727 |
| 4,785,622 | 11/1988 | Plumley et al. | 60/39.55 |
| 4,819,423 | 4/1989 | Vershure, Jr. et al. | 60/39.02 |
| 4,823,546 | 4/1989 | Cheng | 60/39.05 |
| 4,829,763 | 5/1989 | Rao | 60/39.53 |
| 4,872,307 | 10/1989 | Nakhamkin | 60/727 |
| 5,379,589 | 1/1995 | Cohn et al. | 60/727 |

Primary Examiner—Timothy S. Thorpe
Attorney, Agent, or Firm—Burns, Doane, Swecker & Mathis

[57] ABSTRACT

In an air reservoir turbine, comprising a gas turbine group connected for selectable delivery of compressed air from a compressor unit and a compressed air reservoir, and including a hot water reservoir and a waste heat steam generator downstream of the gas turbine group, an amount of steam from the waste heat steam generator is introduced into the gas turbine group and is used for increasing its output. Additionally, hot water from various intercoolers and a heat exchanger is generated in connection with the compressor unit of the gas turbine group. The amount of steam obtained therefrom is admixed to the compressed working air and is used as combustion air for operating the gas turbine group.

12 Claims, 2 Drawing Sheets

AIR RESERVOIR TURBINE

FIELD OF THE INVENTION

The present invention relates to an air reservoir turbine. The invention also relates to a method for operating an air reservoir turbine.

BACKGROUND

So-called air reservoir turbines are known, wherein the compressor, motor-driven by the generator, fills a compressed air reservoir and in this way indirectly stores electrical energy during partial load operations. During high load operations the stored compressed air is expanded in the turbine in a state where it is heated by fuel, in the course of which the output obtained in this manner is completely delivered to the power grid. In the process such air reservoir turbines can be supplemented by a steam circuit connected downstream of the turbines.

It has also known that such air reservoir turbines can be operated as pure gas turbines during the time the compressor and the turbine are operated for connected simultaneous operation. In this case it is possible to connect the compressed air reservoir as a controllable capacity for regulating the output.

In the case where the installation primarily operates in the reservoir mode for supplementing peak demands, the maximally possible output potential is not yet achieved, which has a strong negative influence on the efficiency of the installation.

SUMMARY OF THE INVENTION

The invention is intended to bring relief here. Its object, as distinguished in the claims, is to maximize the output and efficiency of an air reservoir turbine and of the method of operating such an air reservoir turbine of the type mentioned at the outset.

This object is attained in accordance with the invention in that the recuperation of the turbine exhaust gases as well as the waste heat of the intercooler of the compressor unit is initiated.

Steam is generated in at least one pressure stage in a waste heat generator downstream of the gas turbine group, which is added to the compressor air, if possible prior to or during the combustion of the fuel, so that the turbine output is increased by approximately 30 to 40%.

The energy consumption of the compressor unit is reduced on the compressor side by at least one intermediate cooling of the compressed air, and the compressor heat recovered from the compressed air is used for heating pressurized water. This pressurized water is then injected in a partial pressure compressor into the relatively cold steam air, so that partial evaporation under partial pressure can take place. By means of this 15 to 20% of water vapor are also admixed to the compressed air, so that the turbine output is again increased by approximately 30 to 40%.

To maintain this operating principle also during reservoir operation, a hot water reservoir is also required in addition to the compressed air reservoir. The water evaporated in the partial pressure compressor must be continuously replaced by fresh water.

A replacement of the waste heat steam generator by a recuperator for pre-heating the compressed air downstream of the partial pressure compressor is also per se possible. The result of such an arrangement is that, although the efficiency is increased, the output of the turbine is weakened because of the lacking steam portion.

There is, of course, the option of a partial recuperation of the hot turbine exhaust gases for pre-heating the air, in the course of which the steam generation in the waste heat steam generator is correspondingly reduced. This step can be used for optimizing the air reservoir turbine.

Advantageous and practical further embodiments of the attainment of the object of the invention are disclosed in the further dependent claims.

An exemplary embodiment of the invention will be explained in detail below by means of the drawings. All elements not needed for directly understanding the invention have been omitted. The flow direction of the media is identified by arrows.

DETAILED DESCRIPTION

Figure 1:
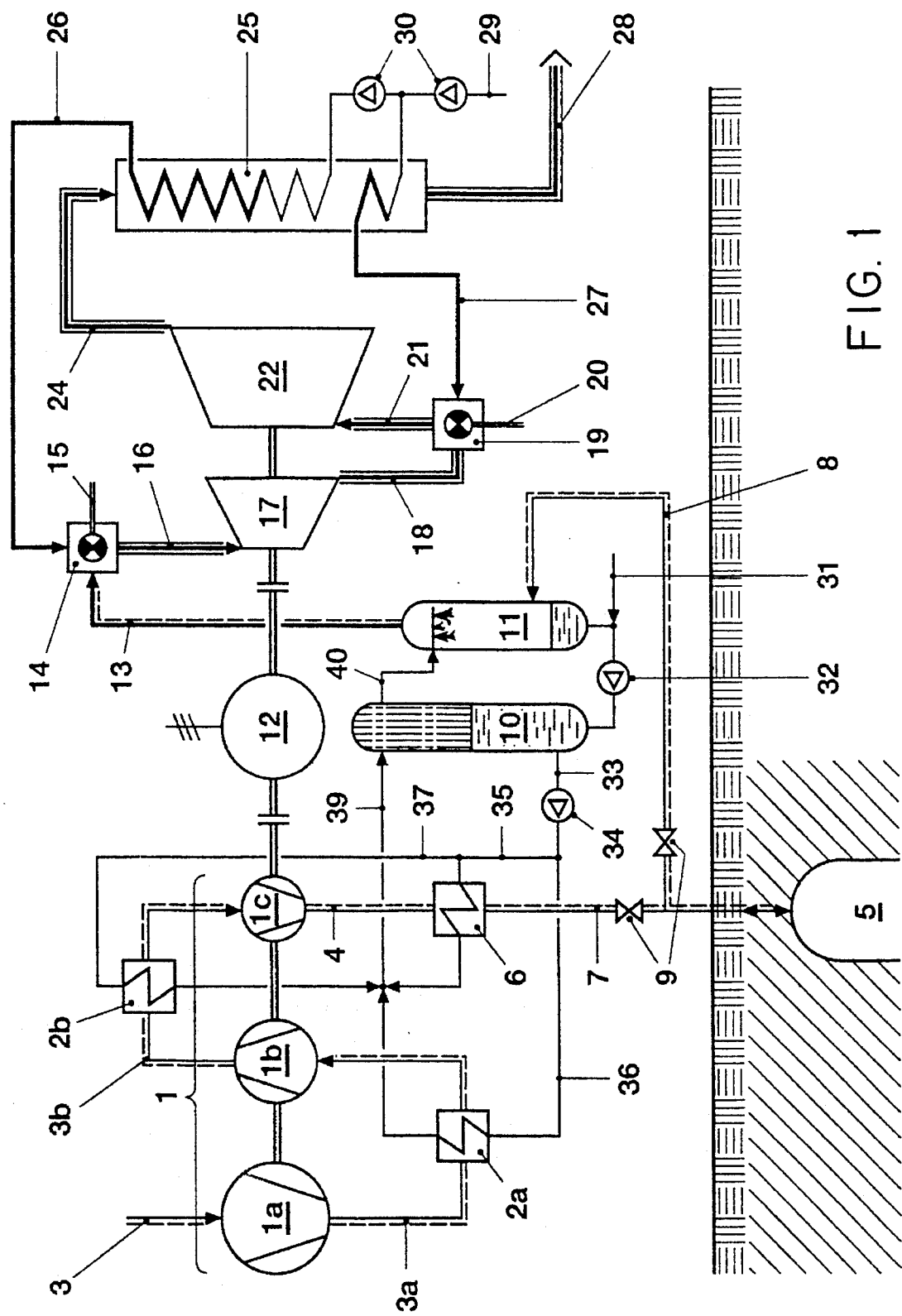
FIG. 1 shows an air-steam reservoir power plant in accordance with the invention.
Figure 2:
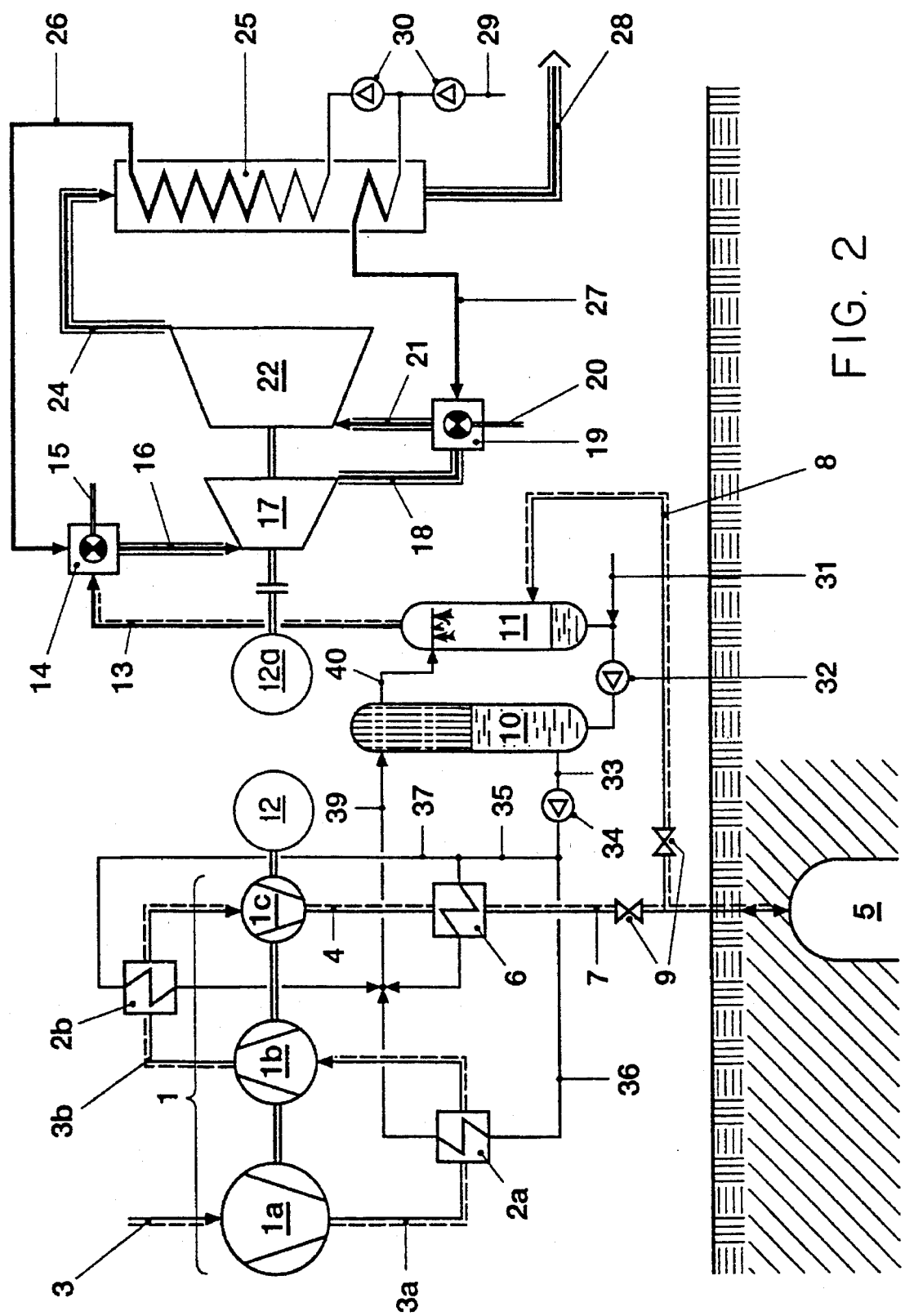
FIG. 2 shows the power plant of FIG. 1 with the compressor unit and the turbine installed on separate shafts.

The drawing figure shows an air-steam reservoir power plant, the units of which are a gas turbine group, a waste heat steam generator 25, a compressed air reservoir 5 and various further reservoir or auxiliary units. The gas turbine group itself comprises a compressor unit 1 consisting of a plurality of compressors 1a, 1b, 1c, which operates upstream of a combustion chamber and turbine system 14, 17; 19, 22. The waste heat steam generator 25 for providing steam, which is generally returned to the gas turbine group, is connected downstream of the last turbine 22. The final, compressed air 4 from the last compressor 1c either flows into a compressed air reservoir 5 or, via a branch line into a partial pressure evaporator 11 located upstream of a first combustion chamber 14, the high-pressure combustion chamber, i.e. the final compressed air 4 flows directly into the compressed air reservoir 5, or directly into the partial pressure evaporator 11, or partially into the compressed air reservoir 5 and, as required, partially into the partial pressure evaporator 11. The following circuits and operation result in connection with the remaining auxiliary units: the aspirated air 3 first flows into a first compressor 1a, in which a first partial compression takes place. This pre-compressed air 3a subsequently passes through a first intercooler 2a until it is admitted at reduced temperature into a second, downstream compressor 1b. This additionally compressed air 3b passes through a further, downstream intercooler 2b before it is finally directed into a third compressor 1c, in which final compression takes place. Subsequently this final compressed air 4 flows through a heat exchanger 6, located upstream of the already mentioned compressed air reservoir 5, in which a third cooling process takes place. A line 8 branches off upstream of this compressed air reservoir 5, which provides compressed work air and is basically used as a take-out line or through which final compressed cooled air 7 flows. This alternating connecting option is maintained by a number of control elements 9 which are appropriately triggered. The following relates to the compressed air reservoir 5: it receives the compressed cooled air 7 of the last compressor 1c, and the compressors 1a, 1b, 1c are driven by means of the electrical device 12, now operated as a motor, and in this way receive the energy to be stored from the power net. As shown in FIG. 2, the turbine 17, 22 and the compressor unit 1 may be installed on separate shafts with a generator 12a on the turbine shaft. In both cases, namely during the connected gas turbine operation as well as during the discharge operation of the compressed air reservoir 5, the relatively cold compressed work air flows initially into the partial pressure evaporator 11, in which mixing with a portion of hot water takes place via a line 40 from an upstream operating hot water reservoir 10, the connective availability of which will be described in detail further down below. A partial evaporation under partial pressure of the hot water 40 takes place by the injection of the portion of hot water 40 upstream of the first combustion chamber in such a way that basically a first water vapor portion of a magnitude of 15 to 20% is admixed to the work air flowing through the line 8. Subsequently, this air/water vapor mixture 13 flows as combustion air into the high pressure combustion chamber 14 in which hot gases 16 are generated by means of adding a fuel 15, which subsequently charge a high pressure turbine 17. The exhaust gases 18 from this high pressure turbine 17 are brought into a low pressure combustion chamber 19, in which, with the addition of a fuel 20, a further caloric processing of the heating gases 21 takes place. The latter then charge a low pressure turbine 22, in which first the final expansion takes place. The exhaust gases from there are passed through the waste heat steam generator 25 in which steam is made available at different pressure levels. A portion of steam 26 of higher pressure is infused in the high pressure combustion chamber 14, another portion of steam 27 of lower pressure is infused into the low pressure combustion chamber 19. The water supply of the waste heat steam generator 25 is symbolized by the schematically represented line 29 with the associated feed pumps 30. This addition of steam has a dual purpose: first, the respective turbine output is increased by 30 to 40% then the NOx emissions are minimized by the effect of the steam on the flame temperature. The exhaust gases, which have been fully used calorically by the waste heat steam generator 25 then flow outside via a chimney in the form of flue gases 28. The circuits of this air-steam reservoir power plant have a second water circuit which is in operative connection with all intercoolers 2a, 2b associated with the compressors 1a, 1b, 1c, with the heat exchanger 6 operating downstream of the last compressor 1c as well as the hot water reservoir 10 operating upstream of the partial pressure evaporator 11. A water supply line 31 replaces the water evaporating in the partial pressure evaporator 11 which, admixed to the final compressed work air 8, escapes via the combustion chambers 14, 19, turbines 17, 22 and the waste heat evaporator 25 through the chimney 28. Otherwise a circulating water flow 33, divided into partial flows 35, 36, 37, takes over the heat removal in the coolers 2a, 2b and 6. By means of this the water is brought to a high temperature level and is supplied via the line 39 and the hot water reservoir 10 to the partial pressure evaporator 11 via a line 40.

I claim:

1. An air reservoir turbine installation having a gas turbine group connected to a compressed air reservoir, and comprising a hot water reservoir, a waste heat steam generator connected to receive an exhaust gas flow downstream of the gas turbine, the gas turbine group comprising a compressor unit, at least one combustion chamber and at least one turbine, wherein the waste heat steam generator is connected to introduce steam into the gas turbine group for increasing an output of the at least one turbine, and further comprising at least one heat exchanger to cool working air compressed by the compressor unit and a partial pressure evaporator to introduce water vapor into the working air, the at least one heat exchanger being connected to deliver heated water to the partial pressure evaporator.

2. An air reservoir turbine in accordance with claim 1, the hot water reservoir is connected to deliver hot water to the partial pressure evaporator the at least one heat exchanger being connected to deliver heated water to the hot water reservoir.

3. An air reservoir turbine in accordance with claim 1, the compressor unit comprising three compressors and an intercooler interposed between a first and a second compressor and between the second compressor and a third compressor.

4. An air reservoir turbine in accordance with claim 3, wherein the intercoolers are connected to deliver heated water to the hot water reservoir for selectable introduction into the working air via the partial pressure evaporator.

5. An air reservoir turbine in accordance with claim 1, wherein the waste heat steam generator is connected to introduce steam into the working air flow at the at least one combustion chamber of the gas turbine group.

6. An air reservoir turbine in accordance with claim 1, wherein the compressor unit and turbine are disposed on separate shafts and each shaft having an electrical machine.

7. An air reservoir turbine in accordance with claim 1, wherein the compressor unit and turbine are disposed on a single shaft having an electrical machine.

8. A method for operating an air reservoir turbine installation having a gas turbine group connected to a compressed air reservoir as a selectable source of compressed air, and comprising a hot water reservoir, a waste heat steam generator connected to receive an exhaust gas of the gas turbine, the gas turbine group comprising a compressor unit with heat exchangers to cool compressed air, at least one combustion chamber and at least one turbine, the method comprising the steps of:

introducing steam generated in at least one pressure stage in the waste heat steam generator to working air in the at least one combustion chamber or immediately downstream of the at least one combustion chamber;

injecting heated water generated in the heat exchangers into a partial pressure evaporator to produce vapor under partial pressure; and introducing the vapor into the working air upstream of the at least one combustion chamber.

9. A method in accordance with claim 8, wherein during operation in which the air reservoir is charged by the compressor unit, the method comprising the steps of driving the compressor unit with an electrical machine operating as a motor, directing hot water generated in the heat exchangers for storage to the hot water reservoir, and directing compressed air from the compressor for storage to the compressed air reservoir.

10. A method in accordance with claim 8, wherein during operation of the at least one turbine with the at least one combustion chamber an electrical machine mounted on a shaft on which the turbine is mounted is operated as a generator, the method comprising the steps of supplying compressed working air from the compressed air reservoir and at least partially saturating the compressed working air in the partial pressure evaporator with evaporated water from the hot water reservoir.

11. A method in accordance with claim 8, during full-load operation of the gas turbine group wherein the compressor unit is operated to provide compressed air to the turbine group, the method comprising the steps of:

directing compressed air in excess of a demand of the turbine group to the compressed air reservoir for storage;

wherein, when compressed air is directed to the compressed air reservoir, a net addition of hot water from the heat exchangers is stored in the hot water reservoir.

12. A method in accordance with claim 8, wherein during periods of peak demand for electricity from the turbine group wherein the compressor unit is not operated, the method comprising the steps of:

directing compressed air from the compressed air reservoir to the turbine group; and directing hot water from the hot water reservoir to the partial pressure evaporator, wherein there is a net subtraction of hot water from the hot water reservoir.

* * * * *